(12) United States Patent
Chen (10) Patent No.: US 8,874,045 B2
(45) Date of Patent: Oct. 28, 2014

(54) RF CIRCUIT AND ISOLATION DETECTING DEVICE THEREOF, AND METHOD FOR MEASURING A DEGREE OF ISOLATION BETWEEN A FIRST RF CIRCUIT AND A SECOND RF CIRCUIT WITH RESPECT TO A FREQUENCY

(71) Applicant: Wistron NeWeb Corp., Hsinchu County (TW)

(72) Inventor: Yung-Jinn Chen, Hsinchu County (TW)

(73) Assignee: Wistron NeWeb Corp., Hsinchu County (TW)

( * ) Notice: Subject to any disclaimer, the term of this patent is extended or adjusted under 35 U.S.C. 154(b) by 126 days.

(21) Appl. No.: 13/792,029

(22) Filed: Mar. 9, 2013

(65) Prior Publication Data

US 2013/0316657 A1  Nov. 28, 2013

(30) Foreign Application Priority Data

May 23, 2012 (TW) .............................. 101118362 A (51) Int. Cl.
*H04B 17/00* (2006.01)

(52) U.S. Cl.
CPC .................................. *H04B 17/0057* (2013.01)
USPC ..................................... 455/67.13; 455/553.1

(58) Field of Classification Search
USPC ............ 455/67.11, 41.2, 114.2, 115.1–115.4, 455/132, 226.1–226.4, 553.1
See application file for complete search history.

(56) References Cited

U.S. PATENT DOCUMENTS

| 8,290,020 | B2 * | 10/2012 | Liu et al. ........................ 375/133 |
| 8,737,924 | B2 * | 5/2014 | Fu et al. ........................ 455/63.1 |
| 2009/0054009 | A1 * | 2/2009 | Yang et al. ..................... 455/78 |
| 2010/0046498 | A1 * | 2/2010 | Hall .............................. 370/350 |
| 2010/0098135 | A1 * | 4/2010 | Eitan ............................ 375/141 |
| 2010/0137025 | A1 * | 6/2010 | Tal et al. ..................... 455/553.1 |
| 2010/0197235 | A1 * | 8/2010 | Wilhelmsson ............... 455/63.3 |
| 2010/0227639 | A1 * | 9/2010 | Kim et al. ..................... 455/525 |
| 2011/0235612 | A1 * | 9/2011 | Abeta et al. .................. 370/329 |
| 2011/0235621 | A1 * | 9/2011 | Ko et al. ....................... 370/338 |
| 2011/0243047 | A1 * | 10/2011 | Dayal et al. .................. 370/311 |
| 2011/0256831 | A1 * | 10/2011 | Hsieh ........................... 455/41.2 |
| 2012/0230252 | A1 * | 9/2012 | Yang ............................. 370/328 |

* cited by examiner

*Primary Examiner* — Blane J Jackson
(74) *Attorney, Agent, or Firm* — The Mueller Law Office, P.C.

(57) ABSTRACT

An isolation detecting device includes a signal receiver for receiving an attenuated RF signal and transmitting at least part of the attenuated RF signal to a power sensor for conversion into a voltage signal, an A/D converter for converting the voltage signal into a numerical value, and a processing module for determining a received transmission power of the attenuated RF signal with reference to the numerical value and at least one reference set, which contains a transmission power and a numerical value associated with a test RF signal, and for further determining an isolation value by subtracting the received transmission power from a preset transmission power at which an original RF signal resulting into the attenuated RF signal is transmitted.

19 Claims, 7 Drawing Sheets

RF CIRCUIT AND ISOLATION DETECTING DEVICE THEREOF, AND METHOD FOR MEASURING A DEGREE OF ISOLATION BETWEEN A FIRST RF CIRCUIT AND A SECOND RF CIRCUIT WITH RESPECT TO A FREQUENCY

CROSS-REFERENCE TO RELATED APPLICATION

This application claims priority of Taiwanese Application No. 101118362, filed on May 23, 2012.

BACKGROUND OF THE INVENTION

1. Field of the Invention

The invention relates to a radio frequency (RF) detecting device, more particularly to an isolation detecting device capable of measuring a degree of isolation between two RF circuits.

2. Description of the Related Art

Because of the increased demand for wireless products, current portable wireless devices, such as smart phones or other mobile devices, often come installed with multiple wireless communication standards, such as WiFi, EDGE, HSPA, EVDO, LTE, and/or Bluetooth. In order to accommodate simultaneous use of these different standards, it is essential to have sufficient degrees of isolation among these different standards. Therefore, to quickly measure the degrees of isolation among these standards has become increasingly important.

Figure 1:
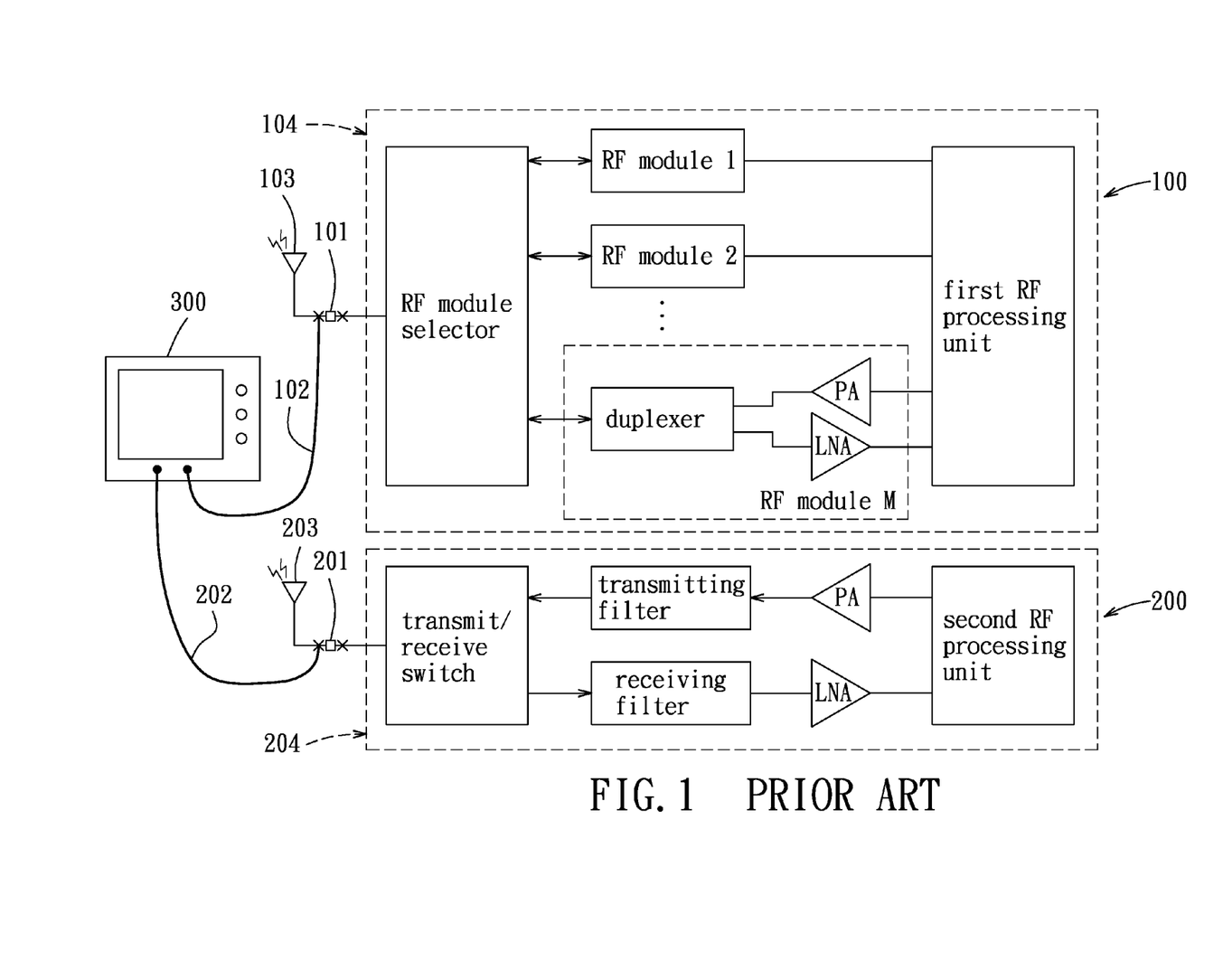
FIG. 1 depicts a conventional way of measuring a degree of isolation between two wireless standards.

FIG. 1 depicts a conventional way of measuring the degree of isolation between two wireless standards, such as between an LTE communication system 100 and a WiFi communication system 200. This is done by disconnecting (through unwelding) an antenna 103, 203 from a connector 101, 201 between the antenna 103, 203 and a back-end RF circuit 104, 204 of each of the LTE communication system 100 and the WiFi communication system 200, and then connecting (through welding) the antenna 103, 203 to a network analyzer 300 using an RF coaxial cable 102, 202. The network analyzer 300 performs two-port small-signal S-parameter analysis to measure the S21 parameter that represents the degree of isolation between the antenna 103 of the LTE communication system 100 and the antenna 203 of the WiFi communication system 200. However, this approach requires the removal of the connections between the antennae 103, 203 and the respective connectors 101, 201 and is thus unduly invasive, and the antennae 103, 203 need to be reconnected with the respective connectors 101, 201 after the measurement is done and is therefore labor intensive. In addition, once the position of one of the antennae 103, 203 is adjusted, this troublesome process has to be carried out all over again. Further, the network analyzer 300 has the downside of only being capable of measuring the degree of isolation with respect to small signals.

SUMMARY OF THE INVENTION

Therefore, the object of the present invention is to provide an apparatus and a method for measuring a degree of isolation between two radio frequency (RF) circuits and capable of performing the measurement dynamically and in a non-invasive manner.

According to one aspect of the present invention, there is provided an isolation detecting device that is adapted to be disposed in a first radio frequency (RF) circuit for receiving at a received transmission power an attenuated RF signal resulting from an original RF signal, which is transmitted by a second RF circuit at a preset transmission power, and for measuring an isolation value that represents a degree of isolation between the first RF circuit and the second RF circuit with respect to a frequency of the original RF signal. The isolation detecting device includes a power sensor, a signal receiver, an analog-to-digital converter, and a processing module. The signal receiver is connected electrically to the power sensor, is adapted for receiving the attenuated RF signal, and transmits at least part of the attenuated RF signal to the power sensor. The power sensor converts said at least part of the attenuated RF signal into a voltage signal. The analog-to-digital converter is connected electrically to the power sensor for receiving the voltage signal therefrom, and converts the voltage signal into a numerical value associated with the attenuated RF signal. The processing module is connected electrically to the analog-to-digital converter for receiving the numerical value therefrom, and has stored therein the preset transmission power and at least one reference set associated with a test RF signal. Said at least one reference set contains a predetermined transmission power and a predetermined numerical value. The processing module determines the received transmission power of the attenuated RF signal with reference to the numerical value associated with the attenuated RF signal and said at least one reference set, and further determines the isolation value by subtracting the received transmission power thus determined from the preset transmission power.

According to another aspect of the present invention, there is provided a radio frequency (RF) circuit that is adapted for receiving an attenuated RF signal at a received transmission power and resulting from an original RF signal, which is transmitted by another RF circuit at a preset transmission power. The RF circuit includes an antenna, an RF processing unit and an isolation detecting device. The antenna is adapted for receiving the attenuated RF signal. The RF processing unit is for processing the attenuated RF signal. The isolation detecting device is connected electrically between the antenna and the RF processing unit for receiving the attenuated RF signal from the antenna, and for measuring an isolation value that represents a degree of isolation between the RF circuit and said another RF circuit with respect to a frequency of the original RF signal. The isolation detecting device includes a power sensor, a signal receiver, an analog-to-digital converter and a processing module. The signal receiver is connected electrically between the antenna and the power sensor for receiving the attenuated RF signal, and transmits at least part of the attenuated RF signal to the power sensor. The power sensor converts said at least part of the attenuated RF signal into a voltage signal. The analog-to-digital converter is connected electrically to the power sensor for receiving the voltage signal therefrom, and converts the voltage signal into a numerical value associated with the attenuated RF signal. The processing module is connected electrically to the analog-to-digital converter for receiving the numerical value therefrom, and has stored therein the preset transmission power and at least one reference set associated with a test RF signal. Said at least one reference set contains a predetermined transmission power and a predetermined numerical value. The processing module determines the received transmission power of the attenuated RF signal with reference to the numerical value associated with the attenuated RF signal and said at least one reference set, and further determines the isolation value by subtracting the received transmission power thus determined from the preset transmission power.

According to still another aspect of the present invention, there is provided a method for measuring an isolation value that represents a degree of isolation between a first radio frequency (RF) circuit and a second RF circuit with respect to a frequency of an original RF signal. The second RF circuit transmits the original RF signal at a preset transmission power, and the first RF circuit receives an attenuated RF signal that results from the original RF signal at a received transmission power. The method includes the following steps:

(A) configuring the first RF circuit to receive the attenuated RF signal, and to determine a numerical value associated with the attenuated RF signal, the numerical value being determined through an analog-to-digital conversion of a voltage signal, which is obtained from at least part of the attenuated RF signal;

(B) configuring the first RF circuit to determine the received transmission power of the attenuated RF signal with reference to the numerical value obtained in step (A) and at least one reference set, said at least one reference set being associated with a test RF signal and containing a predetermined transmission power and a predetermined numerical value; and (C) configuring the first RF circuit to determine the isolation value by subtracting the received transmission power determined in step (B) from the preset transmission power.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
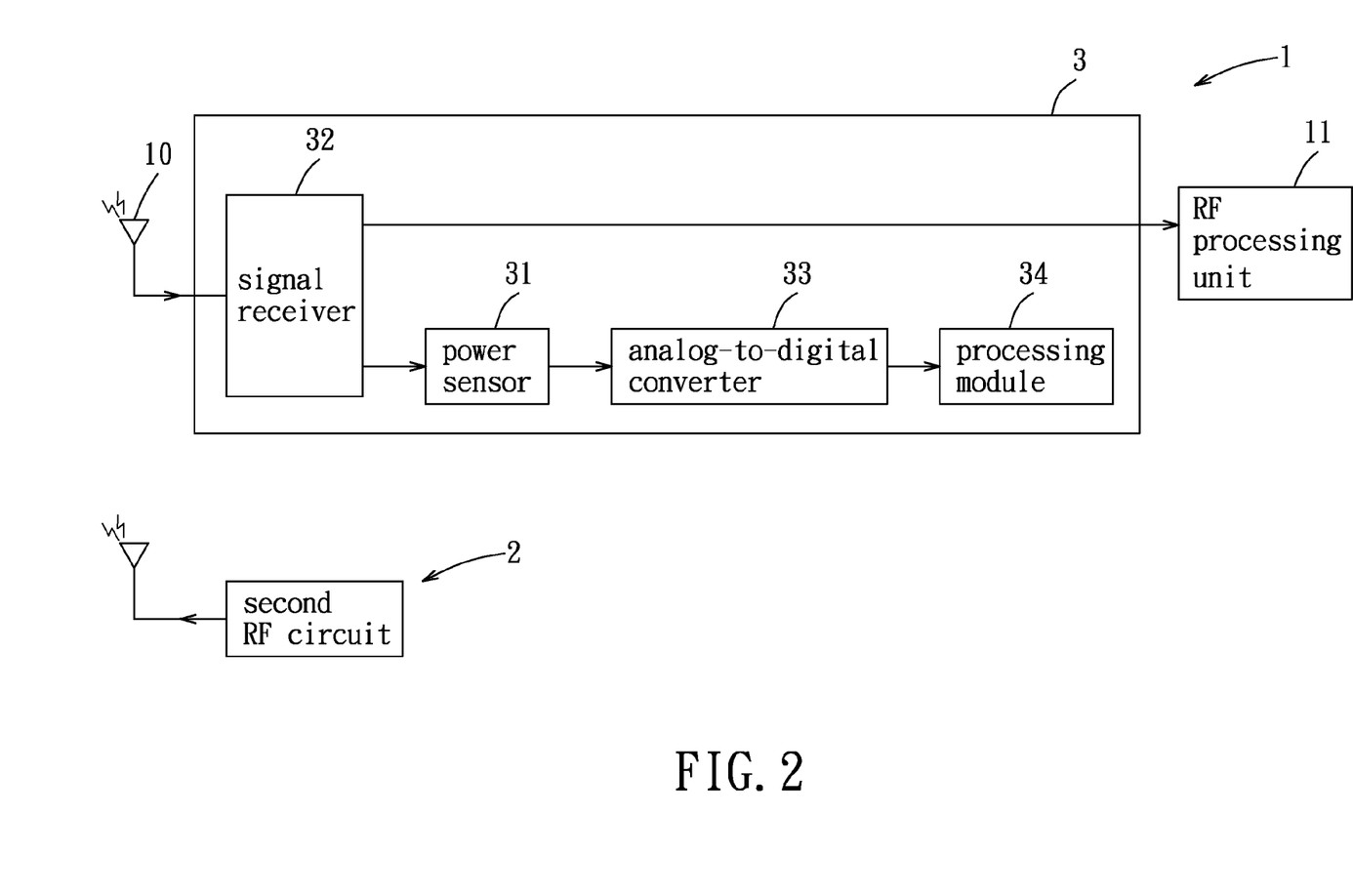
FIG. 2 is a schematic block diagram of an RF system incorporating an isolation detecting device according to the first embodiment of the present invention.

FIG. 2 shows an isolation detecting device 3 according to the first embodiment of the present invention. The isolation detecting device 3 is adapted to be disposed in a radio frequency (RF) circuit 1, and is capable of receiving an attenuated RF signal at a received transmission power (Po). The attenuated RF signal results from an original RF signal, which is transmitted by a second RF circuit 2 at a preset transmission power (Pt). The isolation detecting device 3 is capable of measuring an isolation value that represents a degree of isolation between the first RF circuit 1 and the second RF circuit 2 with respect to a frequency of the original RF signal. In addition to the isolation detecting device 3, the first RF circuit 1 further includes an antenna 10 adapted for receiving the attenuated RF signal, and an RF processing unit 11 for processing the attenuated RF signal. The isolation detecting device 3 is electrically connected between the antenna 10 and the RF processing unit 11.

The isolation detecting device 3 includes a power sensor 31, a signal receiver 32 connected electrically between the antenna 10 and the power sensor 31, an analog-to-digital converter 33 connected electrically to the power sensor 31, and a processing module 34 connected electrically to the analog-to-digital converter 33.

The signal receiver 32 receives the attenuated RF signal from the antenna 10, and transmits at least part of the attenuated RF signal to the power sensor 31. The power sensors 31 generally adopts an RF diode, and is capable of converting said at least part of the attenuated RF signal into a voltage signal.

Figure 3:
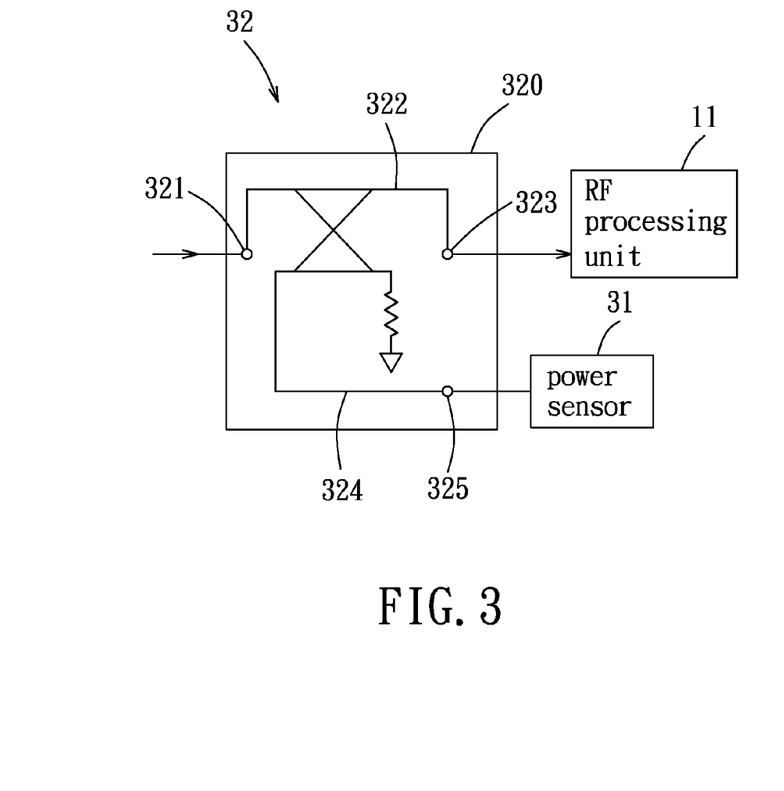
FIG. 3 is a circuit block diagram of a first implementation of the first embodiment, in which a signal receiver is implemented using a directional coupler.

With reference to FIG. 2 and FIG. 3, according to a first implementation of this embodiment, the signal receiver 32 includes a directional coupler 320, which has an input terminal 321 that is connected electrically to the antenna 10 for receiving the attenuated RF signal therefrom, a first output terminal 323 that is connected electrically to the RF processing unit 11, a primary path 322 that is electrically connected between the input terminal 321 and the first output terminal 323 for transmitting the attenuated RF signal from the input terminal 321 and to be outputted to the RF processing unit 11 through the first output terminal 323, a coupling path 324 that obtains said at least part of the attenuated RF signal from the primary path 322 through coupling, and a second output terminal 325 that is electrically connected between the coupling path 324 and the power sensor 31 for outputting said at least part of the attenuated RF signal to the power sensor 31.

Figure 4:
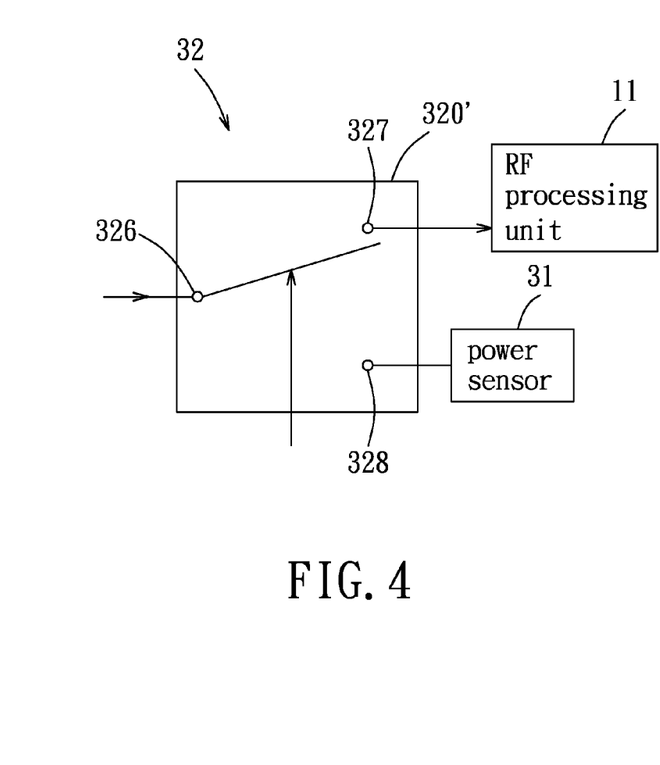
FIG. 4 is a circuit block diagram of a second implementation of the first embodiment, in which the signal receiver is implemented using a single pole double throw switch.

Alternatively, referring to FIG. 2 and FIG. 4, according to a second implementation of this embodiment, the signal receiver 32 includes a single pole double throw (SPDT) switch 320', which has an input terminal 326 that is coupled electrically to the antenna 10 for receiving the attenuated RF signal therefrom, a first output terminal 327 that is connected electrically to the RF processing unit 11, and a second output terminal 328 that is connected electrically to the power sensor 31. The input terminal 326 is controllable to connect to one of the first and second output terminals 327, 328 for outputting the attenuated RF signal through said one of the first and second output terminals 327, 328. In this manner, the input terminal 326 is controlled to connect to the second output terminal 328 when isolation detection is needed, and is controlled to connect to the first output terminal 327 when otherwise.

Figure 5:
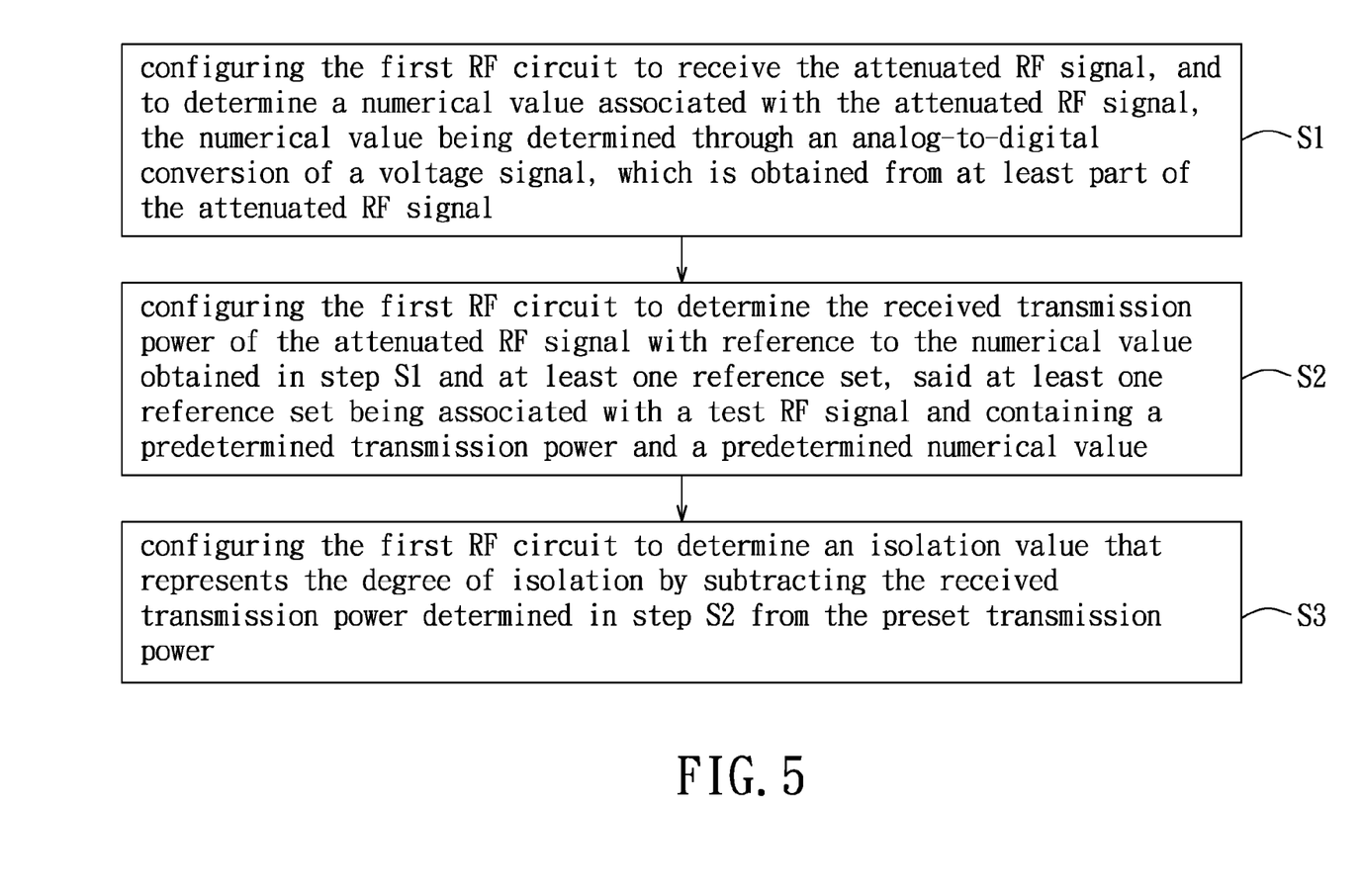
FIG. 5 is a flow chart depicting a method for measuring a degree of isolation between a first RF circuit and a second RF circuit with respect to a frequency according to the first embodiment.

With reference to FIG. 2, FIG. 3 and FIG. 5, the method for measuring a degree of isolation between the first RF circuit 1 and the second RF circuit 2 with respect the frequency of the original RF signal, which is transmitted by the second RF circuit 2 at the preset transmission power (Pt), according to the first embodiment of the present invention will be explained in detail with reference to the first implementation, i.e., where the signal receiver 32 includes the directional coupler 320.

In step S1, the first RF circuit 1 is configured to receive the attenuated RF signal, and to determine a numerical value (Ao) associated with the attenuated RF signal. The numerical value (Ao) is determined through an analog-to-digital conversion of a voltage signal, which is obtained from at least part of the attenuated RF signal.

Specifically, the directional coupler 320 of the isolation detecting device 3 of the first RF circuit 1 receives the attenuated RF signal from the antenna 10 through the input terminal 321, and outputs at least part of the attenuated RF signal to the power sensor 31 through the second output terminal 325 after the coupling path 324 couples said at least part of the attenuated RF signal from the primary path 322. Subsequently, the power sensor 31 converts said at least part of the attenuated RF signal into a voltage signal, which is provided to the analog-to-digital converter 33 for conversion into the numerical value (Ao).

In step S2, the first RF circuit 1 is configured to determine the received transmission power (Po) of the attenuated RF signal with reference to the numerical value (Ao) obtained in step S1 and also with reference to at least one reference set. Said at least one reference set is associated with a test RF signal, and contains a predetermined transmission power (Ps) and a predetermined numerical value (As).

Specifically, the processing module 34 of the isolation detecting device 3 of the first RF circuit receives the numerical value (Ao) from the analog-to-digital converter 33. The processor 34 has stored therein the preset transmission power (Pt) and at least one reference set associated with a test RF signal. Said at least one reference set contains a predetermined transmission power (Ps) and a predetermined numerical value (As). The processing module 34 determines the received transmission power (Po) of the attenuated RF signal with reference to the numerical value (Ao) associated with the attenuated RF signal and also with reference to said at least one reference set. Said at least one reference set may be determined in advance, i.e., prior to performing the isolation detection, by directly inputting into the signal receiver 32 the test RF signal at the predetermined transmission power (Ps) so that the signal receiver 32 transmits at least part of the test RF signal to the power sensor 31 for the power sensor 31 to obtain a test voltage signal, which is then transmitted to the analog-to-digital converter 33 for conversion into the predetermined numerical value (As).

By establishing the reference set in this manner, namely, through directly coupling to the input terminal 321 of the directional coupler 320 a signal generator (not shown) that generates the test RF signal at the predetermined transmission power (Ps) and through determining the predetermined numerical value (As) by passing the test RF signal through the exact same process as the attenuated RF signal (i.e., having at least part of the test RF signal coupled by the coupling path 324 and going through the subsequent conversions), any loss incurred during this process is accounted for when determining the received transmission power (Po) with reference to the reference set. In other words, the reference set is representative of a relationship between a transmission power received at the input terminal 321 and a numerical value determined at the analog-to-digital converter 33. By referring to this relationship, the received transmission power (Po) of the attenuated RF signal can be obtained from the numerical value (Ao) associated with the attenuated RF signal.

The processing module 34 may determine the received transmission power (Po) of the attenuated RF signal based on the following formula:

$$Po = \frac{Ao}{As} \times Ps.$$

Alternatively, the processing module 34 may further have stored therein a lookup table (an example of which is shown in Table 1 below) containing a plurality of the reference sets respectively associated with a plurality of distinct test RF signals, where P1, P2, ..., Pn respectively denote the distinct predetermined transmission powers of the distinct test RF signals, and A1, A2, ..., An respectively denote the distinct predetermined numerical values associated with the distinct test RF signals. The reference sets may be established in the same manner as described above, so further details are omitted herein.

TABLE 1

| Predetermined Transmission Power (dBm) | Predetermined Numerical Value |
| --- | --- |
| P1 = −110 dBm | A1 |
| P2 = −109 dBm | A2 |
| . | . |
| . | . |
| . | . |
| Pn = −40 dBm | An |

In this alternative, the processing module 34 determines the received transmission power (Po) of the attenuated RF signal by searching the lookup table for one of the reference sets, the predetermined numerical value (Ax) contained in which is substantially equal to the numerical value (Ao) associated with the attenuated RF signal, and by taking the predetermined transmission power (Px) contained in said one of the reference sets to be the received transmission power (Po) associated with the attenuated RF signal, where $1 \leq x \leq n$.

Subsequently, in step S3, the first RF circuit 1 is configured to determine an isolation value that represents the degree of isolation between the first RF circuit 1 and the second RF circuit 2 with respect to the frequency of the original RF signal by subtracting the received transmission power (Po) determined in step S2 from the preset transmission power (Pt).

For the second implementation where the signal receiver 32 includes the SPDT switch 320' as shown in FIG. 4, even though the RF signal is entirely transmitted through the second output terminal 328 to the power sensor 31, loss might still be incurred. However, as long as the reference set (s) is established in the manner described above by directly feeding the test signal(s) at the predetermined transmission power(s) (Ps) to the signal receiver 32 and by determining the predetermined numerical value(s) (As) using the analog-to-digital converter 33, the loss, if any, may be accounted for when determining the received transmission power (Po) with reference to the reference set(s).

Figure 6:
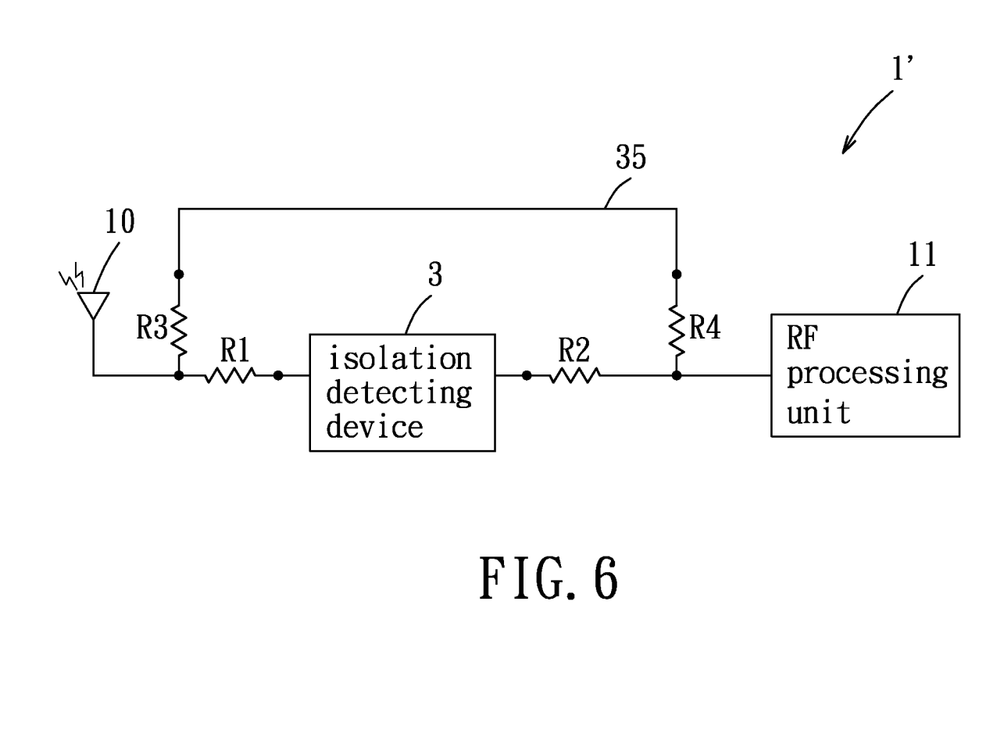
FIG. 6 is a schematic circuit block diagram, illustrating a second embodiment of the present invention.

Referring to FIG. 6, according to the second embodiment of the present invention, an arrangement may be made to the first RF circuit 1' when isolation detection between the first RF circuit 1' and the second RF circuit 2 (as shown in FIG. 2) is only to be carried out once, such as when the first and second RF circuits 1', 2 are within a single wireless product and would have a fixed degree of isolation with respect to a specific frequency. In this configuration, a bypass route 35 parallel to an isolation-detecting route established by a first resistor (R1), the isolation detecting device 3 and a second resistor (R2) that are connected electrically in series, is created after the isolation detection is completed between the antenna 10 and the RF processing unit 11 through the use of series connected third and fourth resistors (R3, R4) with an overall equivalent resistance that is smaller than that of the isolation-detecting route, such that the attenuated RF signal received through the antenna 10 may bypass the isolation detecting device 3 and travel directly from the antenna 10 to the RF processing unit 11 for processing by the RF processing unit 11.

Figure 7:
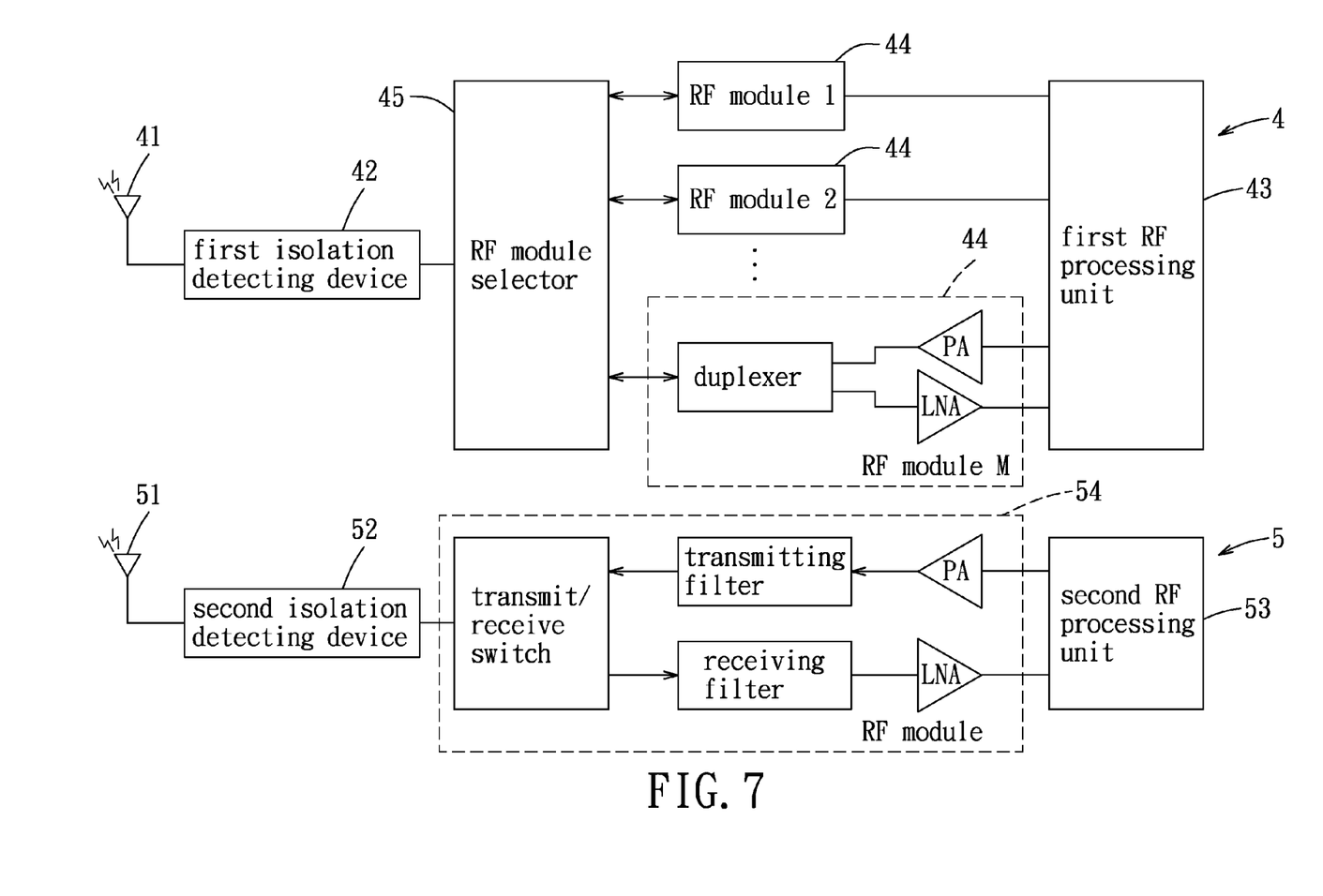
FIG. 7 is a circuit block diagram, illustrating shows a practical example of a wireless communication product incorporating the isolation detecting device of the present invention.

FIG. 7 depicts a practical example of applying the isolation detecting device of this invention to each of a first communication system 4 and a second communication system 5 of a wireless communication product. The first communication system 4 is illustrated as a LTE system, and includes a first antenna 41, a first isolation detecting device 42 coupled to the first antenna 41, a first RF processing unit 43, M number of RF modules 44 operable under different frequency bands, and an RF module selector 45 coupled to the first isolation detecting device 42 and the RF modules 44. The second communication system 5 is illustrated as a WiFi system, and includes a second antenna 51, a second isolation detecting device 52 coupled to the second antenna 51, a second RF processing unit 53, and a second RF module 54 coupled between the second isolation detecting device 52 and the second RF processing unit 53.

The RF module selector 45 of the first communication system 4 is controllable to select one of the M number of different RF modules 44 to be connected to the first isolation detecting device 42. By controlling the RF module selector 45 to connect the RF modules 44 to the first isolation detecting device 41 one by one, and allow various first RF signals corresponding to the respective frequency bands to be transmitted via the first antenna 41 for receipt by the second antenna 51, the second isolation detecting device 52 can determine the degrees of isolation between the second antenna 51 of the second communication system 5 and the first communication system 4 with respect to the frequencies of the respective RF signals.

On the other hand, the second communication system 5 may also generate a second RF signal to be sent via the second antenna 51 for receipt by the first antenna 41, so as to allow the first isolation detecting device 42 to determine the degree of isolation between the first antenna 41 of the first communication system and the second communication system 5 with respect to the frequency of the second RF signal. In the above manner, regardless of whether the first and second antennae 41, 51 are stationary or have adjustable orientations, the first and second isolation detecting devices 42, 52 may always be utilized to determine the degrees of isolation between the two communication systems 4, 5.

Figure 8:
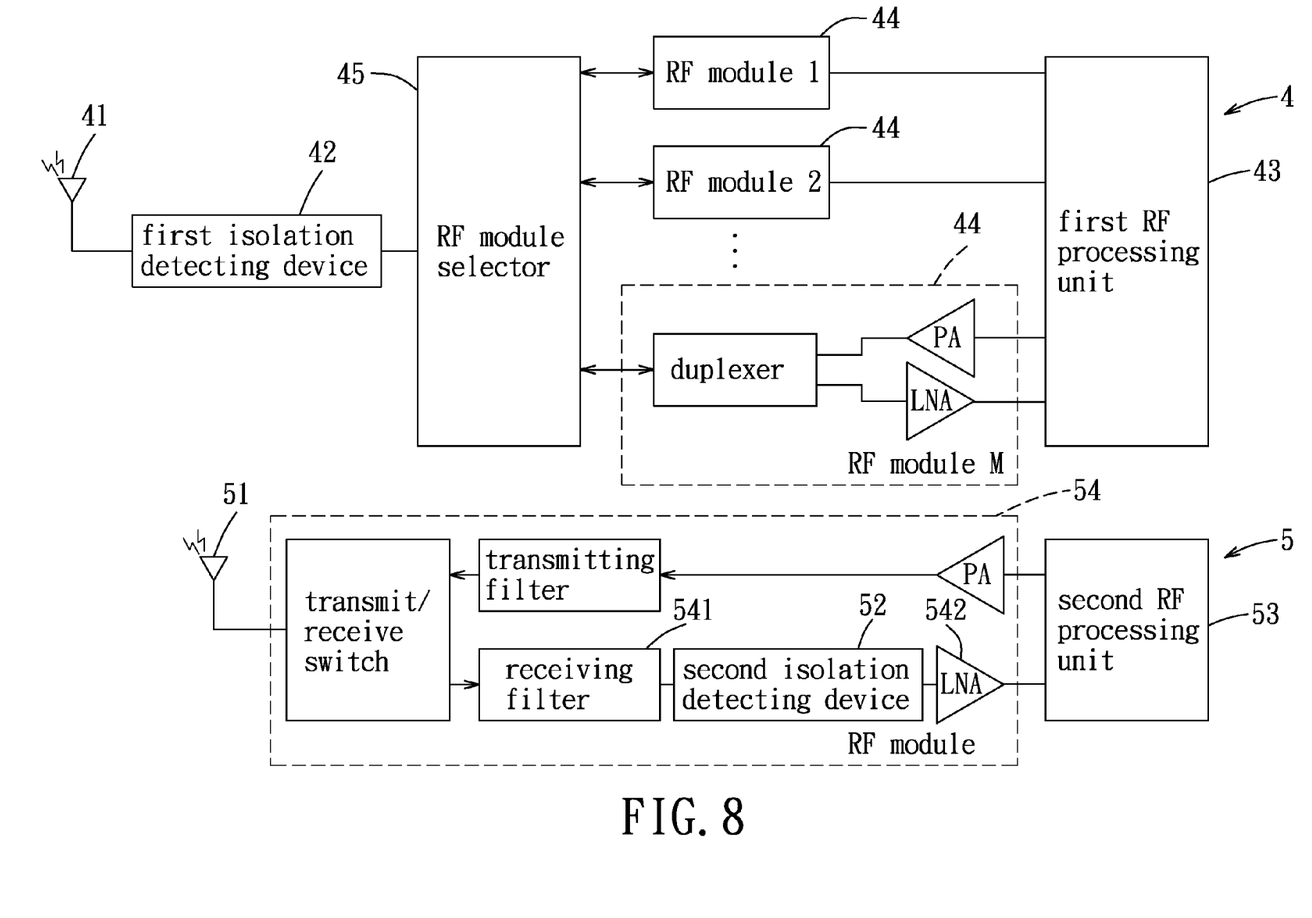
FIG. 8 is a circuit block diagram, illustrating a modification of the wireless communication product of FIG. 7.

FIG. 8 shows a modification of the practical example shown in FIG. 7, in which the second isolation detecting device 52 is placed within the RF module 54 of the second communication system 5 between a receiving filter 541 and a low-noise amplifier 542. In this configuration, the degree of isolation measured by the second isolation detecting device 5 with respect to a first RF signal transmitted via the first antenna 41 of the first communication system 4 would represent a summation of an antenna isolation (i.e., between the second antenna 51 and the first communication system 4) and a circuit isolation (i.e., between the circuits of the second communication system 5 and the first communication system 4).

To summarize, the present invention provides an isolation detecting device that is to be directly incorporated into an RF signal receiving path of an RF circuit for dynamic determination of a degree of isolation with respect to a frequency of an RF signal between the RF circuit incorporating the isolation detecting device and another RF circuit from which the RF signal is initially transmitted. In addition, the isolation detecting device of the present invention converts the received RF signal into a numerical value for determination into an isolation value representative of the degree of isolation with reference to at least one pre-established reference set and a pre-established preset transmission power, at which the RF signal is originally transmitted by said another RF circuit, making the determination of the degree of isolation relatively simple.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An isolation detecting device adapted to be disposed in a first radio frequency (RF) circuit for receiving an attenuated RF signal at a received transmission power and resulting from an original RF signal, which is transmitted by a second RF circuit at a preset transmission power, and for measuring an isolation value that represents a degree of isolation between the first RF circuit and the second RF circuit with respect to a frequency of the original RF signal, said isolation detecting device comprising:
a power sensor;
a signal receiver connected electrically to said power sensor, adapted for receiving the attenuated RF signal, and transmitting at least part of the attenuated RF signal to said power sensor, said power sensor converting said at least part of the attenuated RF signal into a voltage signal;
an analog-to-digital converter connected electrically to said power sensor for receiving the voltage signal therefrom, and converting the voltage signal into a numerical value associated with the attenuated RF signal; and
a processing module connected electrically to said analog-to-digital converter for receiving the numerical value therefrom, and having stored therein the preset transmission power and at least one reference set associated with a test RF signal, said at least one reference set containing a predetermined transmission power and a predetermined numerical value;
wherein said processing module determines the received transmission power of the attenuated RF signal with reference to the numerical value associated with the attenuated RF signal and said at least one reference set, and further determines the isolation value by subtracting the received transmission power from the preset transmission power.

2. The isolation detecting device as claimed in claim 1, wherein said at least one reference set is determined by inputting into said signal receiver the test RF signal at the predetermined transmission power so that said signal receiver transmits at least part of the test RF signal to said power sensor for said power sensor to obtain a test voltage signal, which is transmitted to said analog-to-digital converter for conversion into the predetermined numerical value.

3. The isolation detecting device as claimed in claim 1, wherein said processing module determines the received transmission power of the attenuated RF signal based on $$Po = \frac{Ao}{As} \times Ps$$

where Po denotes the received transmission power of the attenuated RF signal, Ao denotes the numerical value associated with the attenuated RF signal, As denotes the predetermined numerical value contained in said at least one reference set, and Ps denotes the predetermined transmission power contained in said at least one reference set.

4. The isolation detecting device as claimed in claim 1, wherein:
said processing module further has stored therein a lookup table containing a plurality of the reference sets respectively associated with a plurality of distinct test RF signals; and
said processing module determines the received transmission power of the attenuated RF signal by searching the lookup table for one of the reference sets, the predetermined numerical value contained in which is substantially equal to the numerical value associated with the attenuated RF signal, and by taking the predetermined transmission power contained in said one of the reference sets to be the received transmission power associated with the attenuated RF signal.

5. The isolation detecting device as claimed in claim 1, wherein said signal receiver includes a directional coupler having an input terminal that is adapted for receiving the attenuated RF signal, a first output terminal, a primary path that is electrically connected between said input terminal and said first output terminal for transmitting the attenuated RF signal from said input terminal and to be outputted through said output terminal, a coupling path that obtains said at least part of the attenuated RF signal from said primary path through coupling, and a second output terminal that is electrically connected between said coupling path and said power sensor for outputting said at least part of the attenuated RF signal to said power sensor.

6. The isolation detecting device as claimed in claim 1, wherein said signal receiver includes a single pole double throw switch having an input terminal that is adapted for receiving the attenuated RF signal, a first output terminal, and a second output terminal that is connected electrically to said power sensor, said input terminal being controllable to connect to one of said first and second output terminals for outputting the attenuated RF signal through said one of said first and second output terminals.

7. A radio frequency (RF) circuit adapted for receiving an attenuated RF signal at a received transmission power and resulting from an original RF signal, which is transmitted by another RF circuit at a preset transmission power, said RF circuit comprising:
an antenna adapted for receiving the attenuated RF signal;
an RF processing unit for processing the attenuated RF signal; and
an isolation detecting device connected electrically between said antenna and said RF processing unit for receiving the attenuated RF signal from said antenna, and for measuring an isolation value that represents a degree of isolation between said RF circuit and said another RF circuit with respect to a frequency of the original RF signal, said isolation detecting device including
a power sensor,
a signal receiver connected electrically between said antenna and said power sensor for receiving the attenuated RF signal, and transmitting at least part of the attenuated RF signal to said power sensor, said power sensor converting said at least part of the attenuated RF signal into a voltage signal,
an analog-to-digital converter connected electrically to said power sensor for receiving the voltage signal therefrom, and converting the voltage signal into a numerical value associated with the attenuated RF signal, and
a processing module connected electrically to said analog-to-digital converter for receiving the numerical value therefrom, and having stored therein the preset transmission power and at least one reference set associated with a test RF signal, said at least one reference set containing a predetermined transmission power and a predetermined numerical value,
wherein said processing module determines the received transmission power of the attenuated RF signal with reference to the numerical value associated with the attenuated RF signal and said at least one reference set, and further determines the isolation value by subtracting the received transmission power from the preset transmission power.

8. The RF circuit as claimed in claim 7, wherein said at least one reference set is determined by inputting into said signal receiver the test RF signal at the predetermined transmission power so that said signal receiver transmits at least part of the test RF signal to said power sensor for said power sensor to obtain a test voltage signal, which is transmitted to said analog-to-digital converter for conversion into the predetermined numerical value.

9. The RF circuit as claimed in claim 7, wherein said processing module determines the received transmission power of the attenuated RF signal based on $$Po = \frac{Ao}{As} \times Ps$$

where Po denotes the received transmission power of the attenuated RF signal, Ao denotes the numerical value associated with the attenuated RF signal, As denotes the predetermined numerical value contained in said at least one reference set, and Ps denotes the predetermined transmission power contained in said at least one reference set.

10. The RF circuit as claimed in claim 7, wherein:
said processing module further has stored therein a lookup table containing a plurality of the reference sets respectively associated with a plurality of distinct test RF signals; and
said processing module determines the received transmission power of the attenuated RF signal by searching the lookup table for one of the reference sets, the predetermined numerical value contained in which is substantially equal to the numerical value associated with the attenuated RF signal, and by taking the predetermined transmission power contained in said one of the reference sets to be the received transmission power associated with the attenuated RF signal.

11. The RF circuit as claimed in claim 7, wherein said signal receiver includes a directional coupler having an input terminal that is adapted for receiving the attenuated RF signal, a first output terminal that is connected electrically to said RF processing unit, a primary path that is electrically connected between said input terminal and said first output terminal for transmitting the attenuated RF signal from said input terminal and to be outputted to said RF processing unit through said first output terminal, a coupling path that obtains said at least part of the attenuated RF signal from said primary path through coupling, and a second output terminal that is electrically connected between said coupling path and said power sensor for outputting said at least part of the attenuated RF signal to said power sensor.

12. The RF circuit as claimed in claim 7, wherein said signal receiver includes a single pole double throw switch having an input terminal that is adapted for receiving the attenuated RF signal, a first output terminal that is connected electrically to said RF processing unit, and a second output terminal that is connected electrically to said power sensor, said input terminal being controllable to connect to one of said first and second output terminals for outputting the attenuated RF signal through said one of said first and second output terminals.

13. A method for measuring a degree of isolation between a first radio frequency (RF) circuit and a second RF circuit with respect to a frequency of an original RF signal, the second RF circuit transmitting the original RF signal at a preset transmission power, the first RF circuit receiving an attenuated RF signal that results from the original RF signal at a received transmission power, said method comprising the steps of:
(A) configuring the first RF circuit to receive the attenuated RF signal, and to determine a numerical value associated with the attenuated RF signal, the numerical value being determined through an analog-to-digital conversion of a voltage signal, which is obtained from at least part of the attenuated RF signal;
(B) configuring the first RF circuit to determine the received transmission power of the attenuated RF signal with reference to the numerical value obtained in step (A) and at least one reference set, said at least one reference set being associated with a test RF signal and containing a predetermined transmission power and a predetermined numerical value; and
(C) configuring the first RF circuit to determine an isolation value that represents the degree of isolation by subtracting the received transmission power determined in step (B) from the preset transmission power.

14. The method as claimed in claim 13, wherein said at least one reference set is determined by inputting into the first RF circuit the test RF signal at the predetermined transmission power, and by determining the predetermined numerical value through an analog-to-digital conversion of a test voltage signal, which is obtained from at least part of the test RF signal through conversion.

15. The method as claimed in claim 13, wherein, in step (B), the received transmission power of the attenuated RF signal is determined based on $$Po = \frac{Ao}{As} \times Ps$$

where Po denotes the received transmission power of the attenuated RF signal, Ao denotes the numerical value associated with the attenuated RF signal, As denotes the predetermined numerical value contained in said at least one reference set, and Ps denotes the predetermined transmission power contained in said at least one reference set.

16. The method as claimed in claim 13, wherein, in step (B), the received transmission power of the attenuated RF signal is determined by searching, from among a plurality of the reference sets respectively associated with a plurality of distinct test RF signals, for one of the reference sets, the predetermined numerical value contained in which is substantially equal to the numerical value associated with the attenuated RF signal, and by taking the predetermined transmission power contained in said one of the reference sets to be the received transmission power.

17. The method as claimed in claim 13, wherein step (A) includes the sub-steps of:
(A-1) configuring a signal receiver of the first RF circuit to receive the attenuated RF signal;
(A-2) configuring a power sensor of the first RF circuit to convert said at least part of the attenuated RF signal into the voltage signal; and
(A-3) configuring an analog-to-digital converter of the first RF circuit to convert the voltage signal into the numerical value.

18. The method as claimed in claim 17, wherein the signal receiver of sub-step (A-1) includes a directional coupler having an input terminal that is adapted for receiving the attenuated RF signal, a first output terminal, a primary path that is electrically connected between the input terminal and the first output terminal for transmitting the attenuated RF signal from the input terminal and to be outputted through the first output terminal, a coupling path that obtains said at least part of the attenuated RF signal from the primary path through coupling, and a second output terminal that is electrically connected between the coupling path and the power sensor of sub-step (A-2) for outputting said at least part of the attenuated RF signal to the power sensor.

19. The method as claimed in claim 17, wherein the signal receiver of sub-step (A-1) includes a single pole double throw switch having an input terminal that is adapted for receiving the attenuated RF signal, a first output terminal, and a second output terminal that is connected electrically to the power sensor of sub-step (A-2), the input terminal being controllable to connect to one of the first and second output terminals for outputting the attenuated RF signal through the one of said first and second output terminals.

* * * * *